April 9, 1929.  A. MOORHOUSE  1,708,702

MOTOR VEHICLE LICENSE HOLDER

Filed Nov. 3, 1924

Inventor
ALFRED MOORHOUSE

By
Attorney

Patented Apr. 9, 1929.

1,708,702

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE-LICENSE HOLDER.

Application filed November 3, 1924. Serial No. 747,433.

This invention relates to holders and more particularly to holders for motor vehicle license plates.

One of the objects of the present invention is to provide a license plate supporting means adaptable to various sizes of license plates.

A feature of the invention is a plate supporting means in which a means for clamping a plate also clamps its own adjustable parts in position.

Another feature of the invention is a license plate supporting means having parts which may be moved towards and away from each other and clamped in position for plates of various lengths, together with supporting parts which are movable crosswise of the plate and adapted to be clamped in position for plates of various widths.

Other objects of the invention will appear from the following description taken in connection with the drawings, which form a part of this specification, and in which.

Figure 1:
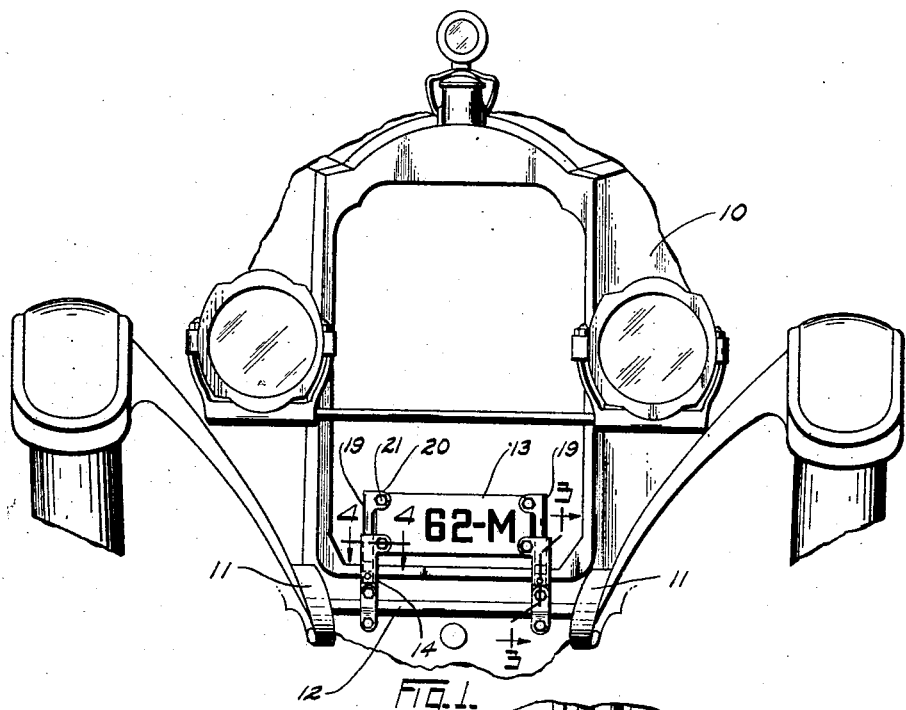
Fig. 1 is a front view of a motor vehicle embodying the invention.
Figure 2:
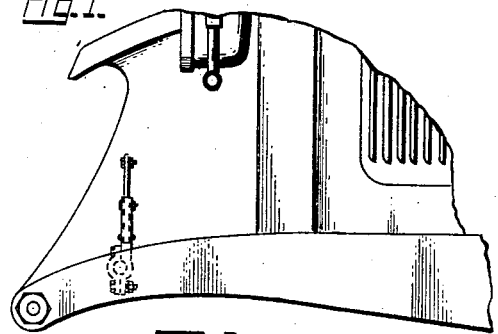
Fig. 2 is a side elevation of the vehicle shown in Fig. 1 with parts broken away.
Figure 3:
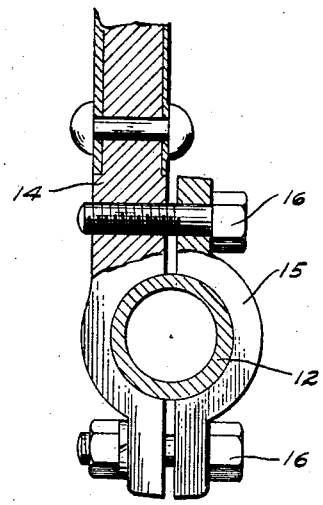
Fig. 3 is an enlarged detail sectional view substantially on the line 3—3 of Fig. 1.

Referring to the drawings, 10 represents generally a motor vehicle and 11 is the frame thereof with a cross bar or rod 12 across the front of the vehicle. This may be termed a supporting rod though of course it also functions to strengthen the frame itself.

13 represents a license plate which is necessary in most States or countries. The license plates of the various States are of differing sizes so that difficulties are sometimes encountered in mounting them on the vehicle. The present invention embodies means for supporting the plate rigidly so that it will not vibrate and the means is adapted to most any size plate.

Two brackets 14 are mounted upon the support rod 12 so that they may be moved lengthwise of the rod relative to each other and clamped in position. A cap 15 and bolts 16, for each bracket, serve to hold the brackets on the rod 12 and clamp them in position thereon.

The upper part of each of the brackets 14 is substantially U-shaped in cross section as shown particularly in Fig. 4, and at the upper end are two ears 17 through which a bolt 18 passes so that the sides of the bracket may be drawn together for clamping purposes as will hereinafter appear.

Figure 4:
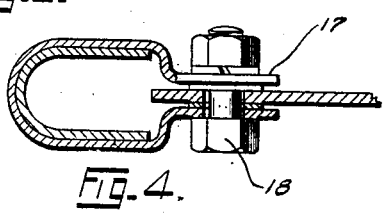
Fig. 4 is an enlarged detail sectional view substantially on the line 4—4 of Fig. 1.

For each of the brackets 14 there is an arm 19 which is preferably also of U-shape in cross section, and these arms telescope into the brackets 14 as shown in Figs. 1 and 4, and they are also provided with ears 20 and bolts 21, similar to the ears and bolts of the bracket 14.

From the above it will be seen that the brackets 14 may be relatively positioned on the supporting rod 12 so that the desired license plate 13 will just fit in between them or so that the usual openings in the lower corners of the license plate will line up with openings in the ears 17 of the brackets. The brackets 14 are clamped in that position by tightening the bolts 16. The arms 19 are then moved in the brackets until the openings in the upper corners of the license plate 13 are aligned with openings in the ears 20 of the arms. The bolts 18 of the brackets 14 are then tightened and the arms 19 are clamped to their respective brackets and at the same time the lower corners of the license plate 13 are clamped between the ears 17. Tightening of the bolts 21 will then clamp the upper corners of the license plate 13 to the arms 19. By this means the four corners of the license plate 13 are rigidly supported on the supporting rod 12 and none of the lettering on the license plate is concealed by any of the bracket parts.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. A motor vehicle license plate holder comprising a horizontal supporting rod, means for supporting a license plate thereon comprising two brackets each having clamping means so arranged that the brackets may be clamped to the supporting rod in any one of several positions relative to each other, arms telescoping with said brackets, clamping means for holding the arms in any one of several positions on the brackets, and means for clamping a license plate to said brackets and to said arms.

2. A license plate support for motor vehicles, comprising a bracket of U-shaped cross section, an arm telescoped into said bracket, and means for clamping said arm and a license plate to said bracket.

3. A license plate support for motor vehicles, comprising a pair of relatively adjustable brackets, arms extending into said brackets, means for attaching a license plate to said arms, and means for attaching the license plate to said brackets and for simultaneously clamping the arms to their respective brackets.

4. A plate holder comprising a support member, a pair of brackets supported on said member, each bracket having means for independently securing it to the member in various positions thereon, an arm on each of said brackets, means independent of the plate for independently securing each of said arms to its respective bracket in any of several positions, and means for securing a plate to said brackets and to said arm.

5. A motor vehicle license plate holder comprising a support, a pair of brackets mounted for relative adjustment on the support, an arm adjustably mounted on each of the brackets and adapted to be retained in an adjusted position by the bracket, and means for securing a plate to the brackets and arms.

6. A license plate support for motor vehicles comprising a bracket having a projecting portion, an arm having a projecting portion and adjustably mounted on the bracket, and means for securing a license plate to the bracket and arm, said plate overlapping only the projecting portions of the bracket and arm.

7. A motor vehicle license plate holder comprising a support, a pair of brackets mounted on the support, each bracket having a projecting portion, an arm having a projecting portion and adjustably mounted on each of the brackets, and means for securing the projecting portions of the brackets and arms to the corners of the license plate.

In testimony whereof I affix my signature.

ALFRED MOORHOUSE.